United States Patent

[11] 3,587,954

| [72] | Inventor | Harold C. Pierce |
| | | Rochester, N.Y. |
| [21] | Appl. No. | 802,511 |
| [22] | Filed | Feb. 26, 1969 |
| [45] | Patented | June 28, 1971 |
| [73] | Assignee | Eastman Kodak Company |
| | | Rochester, N.Y. |

[54] CARTRIDGE OPENER
7 Claims, 4 Drawing Figs.

| [52] | U.S. Cl. | 225/93 |
| [51] | Int. Cl. | B26f 3/00 |
| [50] | Field of Search | 225/93, 95, 97, 103 |

[56] References Cited
UNITED STATES PATENTS

| 3,265,263 | 8/1966 | Lafontant et al. | 225/95X |
| 3,411,682 | 11/1968 | Leader et al. | 225/93 |

*Primary Examiner*—Frank T. Yost
*Attorneys*—P. R. Holmes and R. L. Randall

ABSTRACT: A photographic film cartridge opener and waste ejector incorporating an elongated cartridge moving lever and handle to reduce the operating force required.

HAROLD C. PIERCE
INVENTOR.

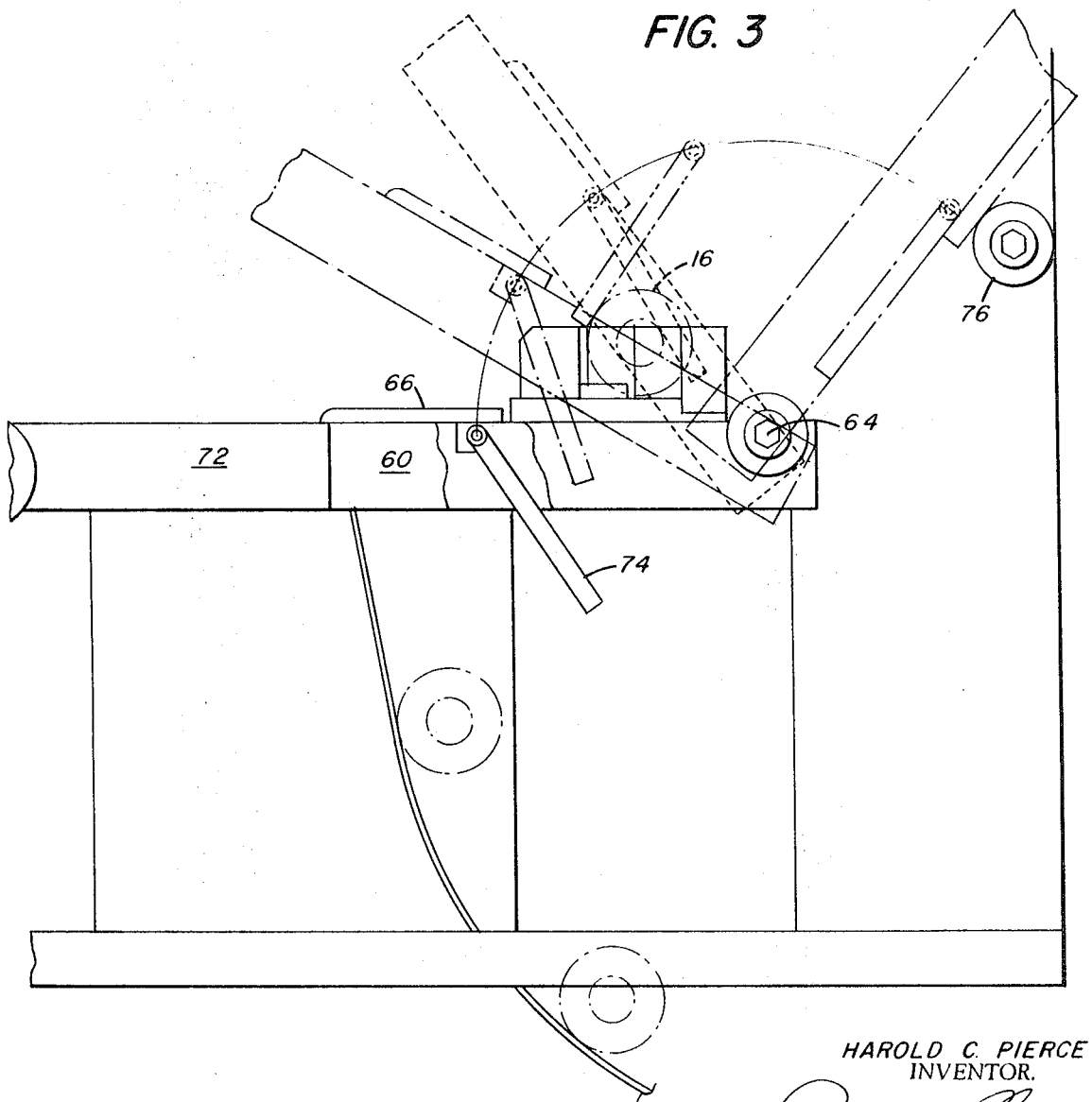

CARTRIDGE OPENER

BACKGROUND OF THE INVENTION

The present invention relates to an improved fixture for breaking open exposed roll film cartridges and capturing the spool of exposed film therein so that the film can be removed for processing.

U.S. Pat. No. 3,260,182 discloses a roll film cartridge which is an expendable item, and is made of plastic or other frangible material. The cartridge consists of a front member and a back member which are joined along a line of separation and form, in combination with a takeup spool, an enclosure for a supply roll of film and an exposure aperture across which the film is advanced from the supply roll upon rotation of the takeup spool. After the film is completely exposed, the exposed cartridge is returned to a processor who must break the cartridge open to remove the film from the takeup spool for processing.

U.S. Pat. No. 3,411,682, issued Nov. 19, 1968, discloses a cartridge breaking fixture which is adapted to break open the cartridge to provide access to the exposed film therein. This patent discloses a fixture for breaking open these cartridges which is simple to operate, inexpensive to manufacture, and is capable of being operated in the dark without danger of personal injury. Moreover, this fixture performs its cartridge opening operation in such a manner that a minimum of chips of the cartridge material are produced which might fall onto and contaminate the film. This fixture also captures the takeup spool of film and holds it so that after the cartridge is removed therefrom the film can be readily pulled from the spool for processing.

However, it has been found that in high volume operations the fixture disclosure in the foregoing patent can cause operator fatigue, reducing productivity an increasing the possibility of accidents. Moreover, when the cartridge is opened with the prior art fixture, the cartridge is held in the operator's hand, which can prove hazardous since the plastic cartridges sometimes break into sharp pieces as they are opened.

Thus, it will be apparent that an improved fixture which reduces the effort necessary to open the cartridge while, at the same time, minimizing the possibility of operator injury would be very desirable.

SUMMARY OF THE INVENTION

Accordingly, the present invention provides a fixture for opening a frangible cartridge incorporating an elongated cartridge-engaging lever and handle which upon movement in one direction, opens and removes the cartridge cover leaving the web-containing spool rotatably supported in the fixture. After the web is unrolled from the spool, the handle is moved in the opposite direction of the starting position and, at the same time, ejects the empty spool from the fixture leaving the fixture ready to accept the next cartridge.

More specifically, the present invention provides a fixture for breaking open a frangible film cartridge having a takeup spool rotatably mounted therein, the opposite ends of which spool are accessible from the outside of the cartridge. The fixture comprises a stationary support including a guideway to receive a film cartridge inserted thereinto, takeup spool end first. A pair of spool spindle means are movably mounted on the support adjacent the guideway and are responsive to the insertion of a cartridge into the guideway to grip the ends of the core of the takeup spool in such a manner that the free end of the cartridge can be pivoted about the axis of the spool and away from the support. A lever means is mounted on the support and is movable about an axis substantially parallel to and adjacent the axis of the spool opposite from the guideway. The lever means comprises a pair of arms extending from the axis along the support outside the spool spindle means. A crossmember joins the arms of the lever means adjacent the inlet end of the guideway. The crossmember is arranged to engage a cartridge inserted in the guideway as the lever means is rotated about its axis to pivot the cartridge about the spool spindle means. At least one abutment means is fixed to the support and extends into the guideway to engage and break the cartridge adjacent the takeup spool during the first part of the pivotal movement of said cartridge about the spool axis. Thereafter, that part of the cartridge engaged by the abutment means is held thereby while the remaining part of the cartridge is pivoted away therefrom to break open that part of the cartridge surrounding the spool sufficiently to allow removal of the cartridge from the spool while the spool remains captured by the spool spindle means.

Furthermore, the present invention provides an ejector member which is pivotally connected to the lever means and is arranged to pass over the spool as the cartridge is opened and to eject the spool from the spindle means as the lever is returned to the starting point.

Moreover, a drive means is arranged to selectively move the lever means. The various features of novelty which characterized the present invention are pointed out with particularity in the claims annexed to and forming a part of this specification. For a better understanding of the invention, its operating advantages and the specific objects obtained by its use, reference should be had to the accompanying drawings and descriptive matter in which a preferred embodiment of the present invention is illustrated and described.

BRIEF DESCRIPTION OF THE DRAWINGS

FIG. 3 is an elevation view showing the operation of the present fixture; and

DESCRIPTION OF THE PREFERRED EMBODIMENT

Figure 4:
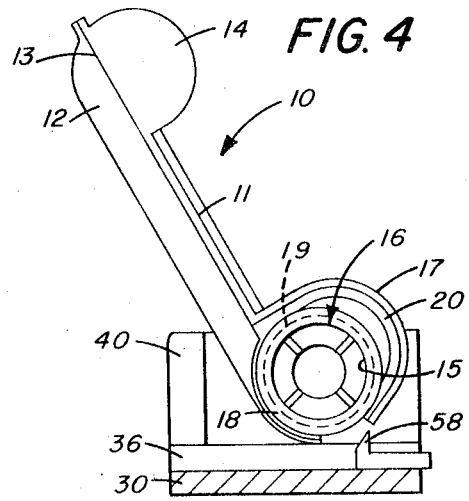
FIG. 4 is a partial section of the fixture showing the cartridge opening operation.

The film cartridge which the present fixture is designed to break open is fully disclosed in U.S. Pat. No. 3,260,182 so that only those features of the cartridge which are necessary to a complete understanding of the purpose and operation of the present invention are shown and described. Referring to FIG. 4, the film cartridge 10, which the fixture of the present invention is designed to break open, is made of plastic, or some other frangible material, and comprises a front component 11 and a back component 12 which are permanently joined together such as by an adhesive, heat and pressure, etc., along a line of separation 13 which extends around the cartridge except at those portions of the cartridge which embrace the takeup spool, as will be described. A supply chamber 14 is formed at one end of the cartridge in which a coil of interleaved backing paper and film is located when the cartridge is loaded during manufacture. The leading end of the backing paper is drawn across an exposure window 11A (shown in phantom in FIG. 1), in the front component 11 and is attached to the core 15 of a takeup spool 16 rotatably mounted in a takeup chamber 17 formed at the other end of the cartridge. The film is advanced across the exposure window a frame at a time by rotation of the winding key or the other film advancing means of a camera which is designed to accommodate a cartridge of this type. Thus, the takeup spool 16 must be accessible to the film-feeding means in the camera and at the same time the cartridge must be made light-tight around this spool. To this end, the takeup spool has relatively thick flanges 18 at each end which are provided with circumferential grooves 19. Those arcuate portions of the front and rear components of the cartridge embracing the takeup spool have inwardly extending ribs 20 which loosely extend into the circumferential grooves 19 in the spool flanges when the cartridge is assembled at the factory after being loaded with film.

The engagement between the ribs 20 on the cartridge components and the circumferential grooves 19 in each of the spool flanges serves two purposes. It rotatably supports the takeup spool in the cartridge and at the same time provides a light-tight connection between the film storing part of the takeup spool and the cartridge. In order to complete the light-tight connection between the front and rear components of the cartridge along the separation line 13 therebetween, these two cartridge components are provided with cooperating ribs and grooves, not shown, which mate with one another.

Figure 1:
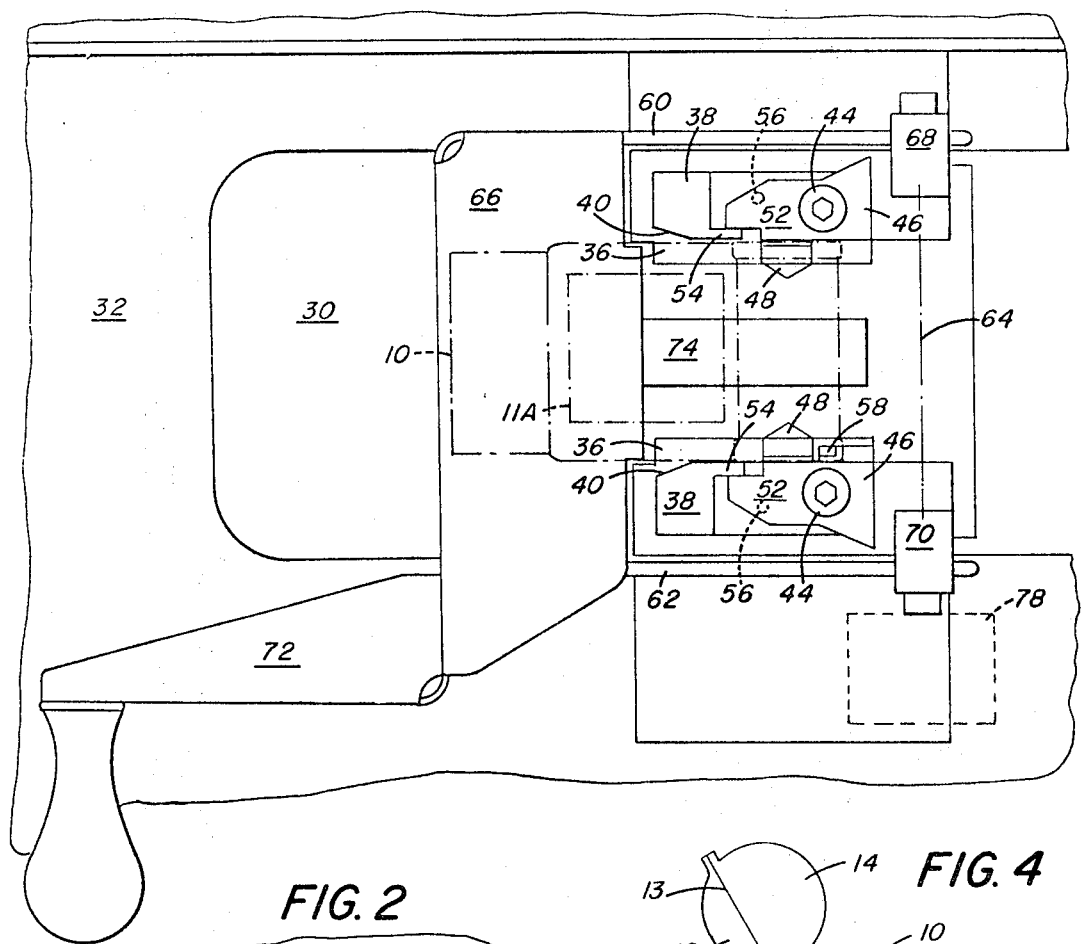
FIG. 1 is a plan view of a breaking fixture constructed in accordance with a preferred embodiment of the present invention.

The fixture for breaking open the described film cartridge which comprises the present invention is shown in FIG. 1 and includes a stationary support 30 which is adapted to be fixed to a support 32 such as a horizontal table top. On the front face of the support 30 a guideway is provided for receiving a cartridge 10, which is inserted takeup spool end first, which guideway is formed by a pair of spacer plates 36 fixed to the face of support 30 in spaced relation which support the longitudinal edges of the back component 12 of the cartridge as it is fed into the guideway. Fixed to the top surface of the spacer plates 36 are a pair of edge guides 38 which are spaced-apart so as to slidably engage the opposite edges of the cartridge as it is slipped into the fixture. The leading corner of each edge guide 38 is beveled as shown at 40 to facilitate the insertion of the cartridge into the guideway in total darkness.

Figure 2:
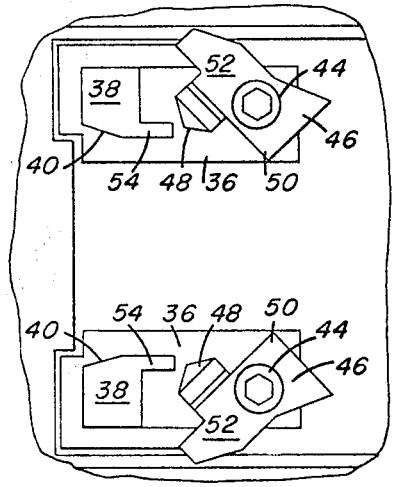
FIG. 2 is a partial plan view of the feature shown in FIG. 1 open to accept a cartridge.

A right-hand and a left-hand spool spindle support member 46 are pivoted at 44 to the top of each of the spacer plates 36 at opposite sides of the guideway. These two spindle supports are adapted to swing between the cartridge receiving position shown in FIG. 2 and a cartridge capturing position shown in FIG. 1 in response to insertion of the cartridge into the fixture. Referring to FIG. 2, it will be seen that when the spindle support members 46 are in their cartridge-receiving position a spindle 48 on each member 46 is pivoted away from the guideway and a projection 50, beyond the pivot point of the members 46, extends into the guideway. When a cartridge 10 is inserted into the guideway, the takeup spool end thereof engages the projection 50 and pivots the support members 46 to a position wherein the spindles 48 thereon engage opposite ends of the takeup spool 16 and thus capture the cartridge. The spindles have an outside diameter which is slightly less than the inside diameter of the hollow core 15 of the takeup spool and have tapered ends, the corners of which are somewhat rounded to permit the spindles to pivot into and out of the bore of the spool. Movement of the spindle supports to their cartridge holding positions, FIG. 1, in response to the insertion of a cartridge into the guideway is limited by the engagement of an arm 52, on each spindle support with a projection 54 on the associated edge guide 38. The spindle supports 46 may be frictionally retained in both of their two positions by spring-loaded balls 56 engaging one of the other of two ball detents formed in each of the spindle supports and arcuately spaced about pivot points 44.

An abutment means or knife edge 58 is disposed between the spacer plates 36 on the upper surface of the support 30. The knife edge is disposed so as to engage a corner of the cartridge as it is pivoted about the spindles 48 whereby the seal between the front and back components of the cartridge is ruptured.

Lever means including a pair of arm members 60 and 62 extend along the outer sides of the spacer plates 36 from an axis 64, substantially parallel to the axis of a spool held by the spindles 48 and adjacent thereto opposite from the insertion guideway, to a location beside the guideway. A crossmember 66 joins the arms adjacent the inlet of the guideway and, in a first position lies just subjacent the plane of the guideway. The arms 60 and 62 are rotatably supported at 68 and 70 to rotate about axis 64. A handles 72 extends from arm member 62 from the side of the crossmember 66 opposite the axis 64. An ejector member 74 is pivotally connnected to the crossmember 66 and depends therefrom as illustrated in FIG. 3. The ejector member is free to rotate in an arc somewhat less than 90° between a position substantially coplanar with the crossmember 66 and a position approximately 75° below horizontal, as illustrated in solid lines in FIG. 3.

In operation, a cartridge is inserted into the fixture and the takeup spool thereof is captured by the spindles 48. The other end of the cartridge is supported by the upper surface of the crossmember 66 of the lever means. The handle 72 is grasped by the operator and the lever means is rotated about axis 64 rotating the cartridge about spindles 48. During this movement the cartridge either pivots on the flanges of the takeup spool 16 or the takeup spool pivots on the spindles 48, depending upon whichever of these two pivot points is the most free. In either case the cartridge pivots relative to the stationary parts of the fixture about the axis of the takeup spool.

During the first few degrees of the pivotal movement of the cartridge the cartridge moves freely and can be readily accelerated. One corner of the projecting shelf of the cartridge than strikes the knife edge 58 of the abutment means. By moving the cartridge through this position with a rather quick stroke the knife edge 58 will break the corner of the back component away and rupture the seal between the front and back components of the cartridge. Further movement of the lever means and the cartridge, which now requires slightly more pressure because the breaker point is holding the front component from further pivotal movement, causes the back component of the cartridge to swing away from the front component and hence rip the seal along the separation line 13 between the two cartridge components. This condition is shown fig. 4. The cartridge finally reach a point, usually 90° from the loading position, where that part of the back component of the cartridge embracing the takeup spool is separated from the front component of the cartridge by a sufficient amount that the cartridge is pulled from the takeup spool 16 leaving the takeup spool 16, with the film wound thereon, captured by the spindles 48. The motion of the lever on the freed cartridge propels it to the right in the illustration to a waste collection chamber. As may readily be seen in FIG. 3, the lever means is rotated in a clockwise direction, as illustrated by the dot-dash lines, through the cartridge-opening and disposing operation to a rest position where it is supported, such as by stop 76, in the furthest right position illustrated when the spool 16 is captured by the spindle 48. The motion of the lever member and ejector member during the cartridge opening operation are illustrated by the dot-dash views in FIG. 3. The end of the film or the end of a paper leader can then be grasped and pulled outwardly to readily remove the film from the spool for further handling, e.g., splicing to a roll of other film strips for continuous processing.

The takeup spool, possibly with a coil of black interleaving paper attached thereto, can then be removed from the fixture. This is accomplished simply by returning the lever means to the starting position. While the ejector member 74 is pivoted so as to ride over the surface of the spool 16 as the lever means is rotated clockwise to open the cartridge, it is restrained when the lever means is rotated counterclockwise so that it contacts the now-empty spool, as indicated by the dotted line view in FIG. 3, and exerts a force thereon. By virtue of the arrangement of the spindles 48 relative to the pivots 44, this force causes the pivoted spindle members 46 to move to an open position wherein the spindles 48 free the ends of the spool, permitting it to drop to a waste collector, and the fixture is reset for the insertion of the next cartridge.

While the foregoing description has been directed to a manually operated cartridge opening fixture, it will be appreciated that the operation of the lever means can be accomplished by a drive means such as a small electric motor, shown in phantom at 78 in FIG. 1, connnected to one of the arm members 62.

Accordingly, it will be seen that the present invention provides an improved cartridge opener which may be safely operated in the dark and which reduces operator effort. MOreover, the present arrangement automatically ejects the empty spool, leaving the fixture ready to accept the next cartridge, increasing the productivity possible.

The invention has been described in detail with particular reference to preferred embodiments thereof, but it will be understood that variations and modifications can be effected within the spirit and scope of the invention as described hereinabove and as defined in the appended claims.

I claim:

1. A fixture for opening a frangible cartridge having a cover and a spool, said fixture comprising stationary support means, means for rotatably holding said cartridge mounted on said support means, lever means mounted on said support and movable about an axis substantially parallel to the axis of said spool and disposed adjacent said cartridge-holding means to engage an inserted cartridge as the lever means is rotated about said axis and to pivot said cartridge about said cartridge-holding means, and abutment means arranged to engage and break said cartridge adjacent said spool to break open that part of the cartridge surrounding said spool sufficiently to remove the cartridge from said spool while the spool remains gripped by said cartridge-holding means.

2. A fixture for opening a frangible cartridge having a spool rotatably mounted therein, said spool having opposite ends which are accessible from the outside of the cartridge, said fixture comprising a stationary support including a guideway to receive a cartridge inserted thereinto spool end first, a pair of spool spindle means movably mounted on said support adjacent said guideway and responsive to the insertion of a cartridge into said guideway for gripping the ends of said spool so that the free end of said cartridge can be pivoted about the axis of said spool and away from said support, lever means mounted on said support and movable about an axis substantially parallel to the axis of said spool and disposed adjacent said spool spindle means to engage an inserted cartridge as the lever means is rotated about said axis and to pivot said cartridge about said spool spindle means, and at least one abutment means arranged to engage and break said cartridge adjacent said spool to break open that part of the cartridge surrounding said spool sufficiently to remove the cartridge from said spool while the spool remains gripped by said spool spindle means.

3. The invention according to claim 2, wherein an ejector member is pivotally connected to the lever means, said ejector member arranged to pass over the spool as the cartridge is opened and to eject said spool from said spindle means as said lever means is returned to the starting point.

4. The invention according to claim 2, wherein drive means is arranged to selectively move said lever means.

5. A fixture for breaking open a frangible film cartridge having a takeup spool rotatably mounted therein, said spool having a core whose opposite ends are accessible from the outside of the cartridge, said fixture comprising a stationary support including a guideway to receive a film cartridge inserted thereinto take up spool end first, a pair of spool spindle means movably mounted on said support adjacent said guideway and responsive to the insertion of a cartridge into said guideway for gripping the ends of the core of said takeup spool so that the free end of said cartridge can be pivoted about the axis of said spool and away from said support, lever means mounted on said support and movable about an axis substantially parallel to the axis of said spool and disposed adjacent said spool spindle means opposite from said guideway, said lever means comprising a pair of arms extending from said axis along said support outside said spool spindle means and a crossmember joining said arms adjacent the inlet end of said guideway, said crossmember arranged to engage a cartridge inserted in said guideway as the lever means is rotated about said axis to pivot said cartridge about said spool spindle means, and at least one abutment means fixed to said support and extending into said guideway to engage and break said cartridge adjacent said takeup spool during the first part of the pivotal movement of said cartridge about said spool axis and thereafter hold that part of the cartridge engaged thereby while the remaining part of the cartridge is pivoted away therefrom to break open that part of the cartridge surrounding said spool sufficiently to allow removal of the cartridge from said spool while it remains gripped by said spindle means.

6. The invention according to claim 5, wherein an ejector members is pivotally connected to the crossmember, said ejector member arranged to pass over the spool as the cartridge is opened and to eject said spool from said spindle means as said lever means is returned to the starting point.

7. The invention according to claim 5, wherein drive means is arranged to selectively move said lever means.

UNITED STATES PATENT OFFICE
CERTIFICATE OF CORRECTION

Patent No. 3,587,954　　　　　　　　　　Dated　June 28, 1971

Inventor(s) Harold C. Pierce

It is certified that error appears in the above-identified patent and that said Letters Patent are hereby corrected as shown below:

Column 1, line 33, "disclosure" should read -- disclosed --; line 34, "an" should read -- and --; line 51, "of" should read -- to --. Column 2, line 30, "feature" should read -- fixture --. Column 4, line 27, after "shown" insert -- in --; line 27, "reach" should read -- reaches --; line 40, "spindle" should read -- spindles --; line 71, "MOreover" should read -- Moreover --. Column 6, line 33, after "said" insert -- spool --; line 35, "members" should read -- member --.

Signed and sealed this 25th day of July 1972.

(SEAL)
Attest:

EDWARD M. FLETCHER, JR.　　　　　　　ROBERT GOTTSCHALK
Attesting Officer　　　　　　　　　　Commissioner of Patents